H. E. FRY AND W. O. KEITER.
BROOM HOLDER.
APPLICATION FILED APR. 21, 1919.
1,329,394.
Patented Feb. 3, 1920.
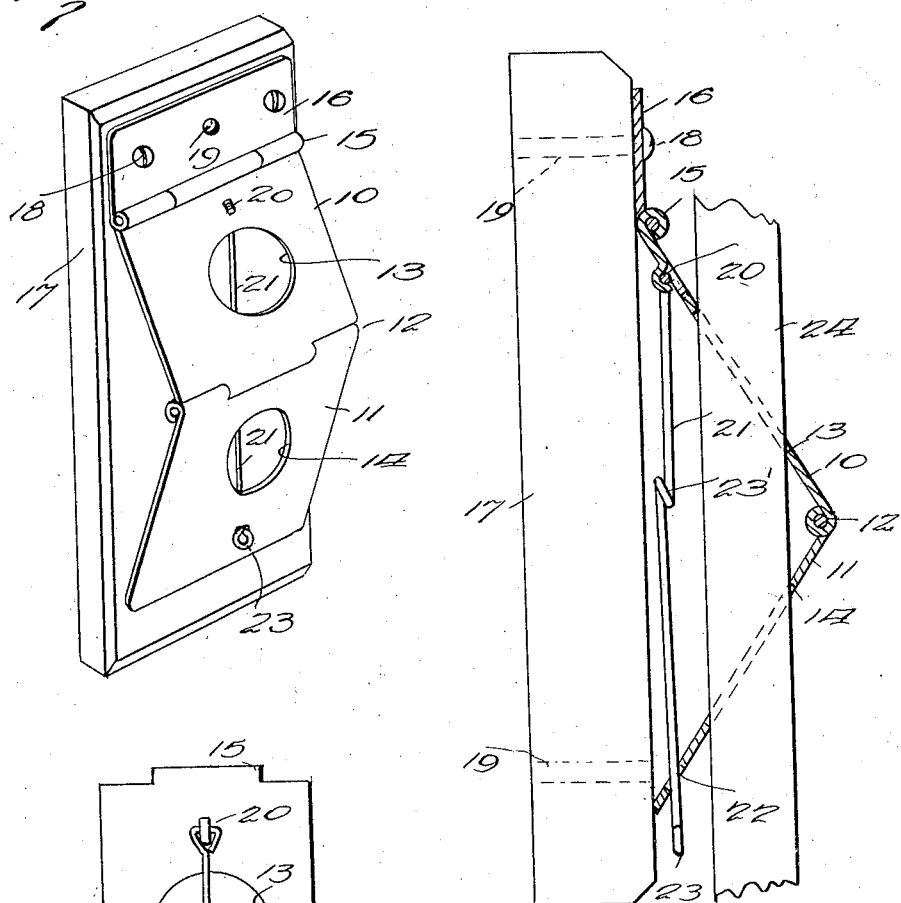
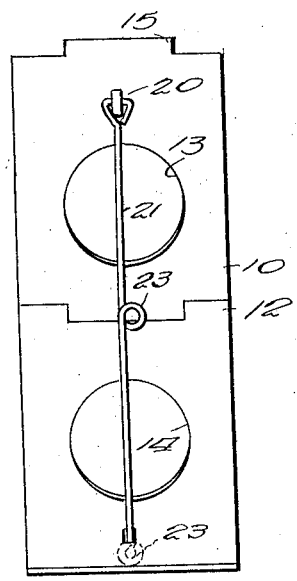
Harvey E. Fry
Walter O. Keiter.
Inventors
By Geo. P. Kimmel
Attorney

UNITED STATES PATENT OFFICE.

HARVEY E. FRY AND WALTER O. KEITER, OF LOCKPORT, NEW YORK.

BROOM-HOLDER.

1,329,394.   Specification of Letters Patent.   Patented Feb. 3, 1920.

Application filed April 21, 1919. Serial No. 291,536.

*To all whom it may concern:*

Be it known that we, HARVEY E. FRY and WALTER O. KEITER, citizens of the United States, residing at Lockport, in the county of Niagara and State of New York, have invented certain new and useful Improvements in Broom-Holders, of which the following is a specification.

This invention relates to improvements in broom holders, and has for one of its objects to simplify and improve the construction and increase the efficiency and utility of devices of this character.

Another object of the invention is to provide a device of this character whereby the broom may be inserted within the holder and moved upwardly a short distance and then released when the holder will automatically grip the handle and hold it in suspension.

With these and other objects in view as will appear as the description proceeds the invention comprises the novel features of construction as hereafter shown and described and then specifically pointed out in the claims, and in the drawings illustrative of the preferred embodiment of the invention, Figure 1 is a perspective view of the improved device, Fig. 2 is a longitudinal sectional elevation of the same with a broom handle supported therein, and, Fig. 3 is a rear elevation of the gripping feature of the attachment of the device detached.

The improved device comprises coacting body members 10—11 hingedly united at 12 and provided respectively with handle receiving openings 13—14. The upper member 10 is hingedly united at 15 to an attaching member 16, the latter in turn attached to a base member 17 by screws or other suitable means 18.

The base member 17 is provided with suitable screw receiving apertures indicated at 19, to enable the base member to be attached permanently to a support, as a wall or other structure.

The device may thus be attached in any convenient position in the room where it is accessible to the user of the broom to support the latter.

Hingedly united at 20 to the member 10 is a rod 21, the latter extending downwardly through an aperture 22 in the member 14. The rod 21 is provided with an eye 23 at its lower end to limit the downward movement of the member 11, and likewise provided with an intermediate eye 23′ to limit the upward movement of the member 11. The rod 21 thus coacts to initially support the members 10—11 in inclined relation as shown in Figs. 1 and 2 so that the broom handle, indicated at 24, may be inserted more readily through the openings 13—14 in an upward direction. When the broom handle is inserted the members 10—11 will be moved toward closed position to a limited extent, and then when the lifting force on the handle is removed and the handle dropped the members 10—11 will immediately grip the handle and hold it from further downward movement as indicated in Fig. 2. The holder thus becomes automatic by the release of the handle. The stop 22 prevents the members 10—11 from assuming the position of longitudinal alinement, but will retain them in the convenient position shown practically in Fig. 2 ready to receive the handle. The stop 23′ likewise acts as a means for preventing the members 10—11 from being folded into close contact by limiting undue upward movement, as will be obvious.

The improved device is simple in construction, can be inexpensively manufactured of any suitable material such as stamped sheet metal, cast iron, wire or the like and constructed wholly by machinery, thus avoiding manual labor.

The apertures 13—14 may be of any required shape to adapt them to the handles of various shapes or sizes.

The stop member 21 may be of any suitable material such as a chain, cable, or the like, or of wire as shown.

The device may be operated with one hand and hold the broom or other article securely away from the wall.

Claims:

1. In a broom holder, coacting members hingedly united and each having a handle engaging aperture, and means for hingedly uniting one of said members to a support.

2. In a broom holder, coacting members hingedly united and each having a handle engaging aperture, means for hingedly uniting one of said members to a support, and a stop means for limiting the movement in one direction.

3. In a broom holder, a base member adapted to be attached to a support, coacting members hingedly united and each having a handle engaging aperture, and means for hingedly uniting one of said members to said base member.

4. In a broom holder, coacting members hingedly united and having handle receiving apertures, means for hingedly uniting one of said members to a support, and a rod hingedly united to one of said members and extending through an aperture in the other member, said rod having stops in spaced relation.

5. In a broom holder, coacting members hingedly united and having handle receiving apertures, means for hingedly uniting one of said members to a support, and a rod hingedly united to one of said members and extending through an aperture in the other member, said rod having a terminal stop to limit the outward movement of the coacting members.

In testimony whereof, we affix our signatures hereto.

HARVEY E. FRY.
WALTER O. KEITER.